United States Patent [19]

Maudal

[11] Patent Number: 5,600,188
[45] Date of Patent: Feb. 4, 1997

[54] LOW STICTION, DUAL DRIVE, MOTIVE SYSTEM

[76] Inventor: Inge Maudal, 604 Lassen La., Costa Mesa, Calif. 92626-3122

[21] Appl. No.: 230,967

[22] Filed: Apr. 21, 1994

Related U.S. Application Data

[63] Continuation-in-part of Ser. No. 967,676, Oct. 26, 1992, abandoned, which is a continuation-in-part of Ser. No. 485,053, Feb. 26, 1990, Pat. No. 5,311,091.

[51] Int. Cl.$^6$ .................................................. H02K 41/00
[52] U.S. Cl. .............................................................. 310/12
[58] Field of Search ................................. 310/12, 15, 17, 310/19, 114

[56] References Cited

U.S. PATENT DOCUMENTS

| | | | |
|---|---|---|---|
| 5,235,226 | 8/1993 | Olsen et al. | 310/12 |
| 5,334,892 | 8/1994 | Chitayat | 310/12 |
| 5,530,303 | 6/1996 | Takei | 310/12 |

*Primary Examiner*—Matthew V. Nguyen

[57] ABSTRACT

A dual drive control system applicable to precision machine tools and robotics eliminates the consequences resulting from coulomb friction and stiction by avoiding the operating points where these defects manifest themselves. A first embodiment consists of a dovetail slide having a base and a motive slide, two motors, a feedscrew, and a helical gear assembly. The feedscrew is mounted parallel to the linear motive direction of the slide; a helical gear is mounted with its axis normal to the feedscrew and with its teeth meshing with the screw threads of the feedscrew. The first motor is mounted on the base and imparts rotation to the feedscrew. The second motor is mounted on the slide and imparts rotation to the helical gear. In operation, the first motor turns the feedscrew at a continuous speed. The second motor drives the helical gear so that its teeth follow the threads of the rotating feedscrew. When the speeds are eequal there is zero linear motion of the helical gear assembly relative to the feedscrew, and consequently zero motion of the dovetail slide. However, changing the differential speed of the motors produces a linear motion of the slide that is proportional to the differential motor speed. Because the individual motor do not reverse direction, and thereby passes through zero velocity, there is no resulting jitter due to coulomb friction or stiction.

9 Claims, 3 Drawing Sheets

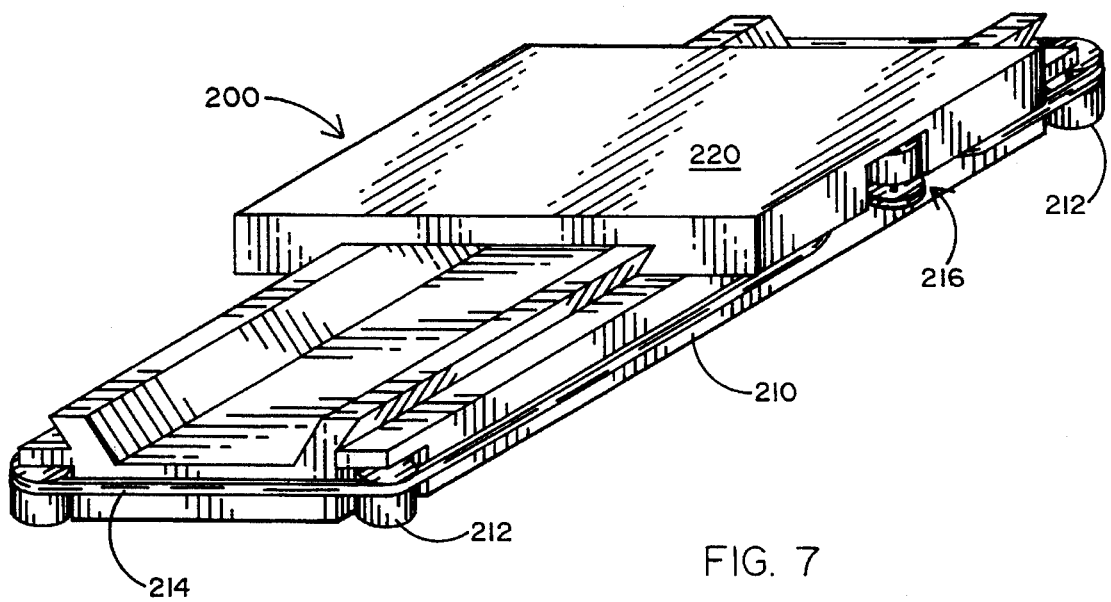
FIG. 7
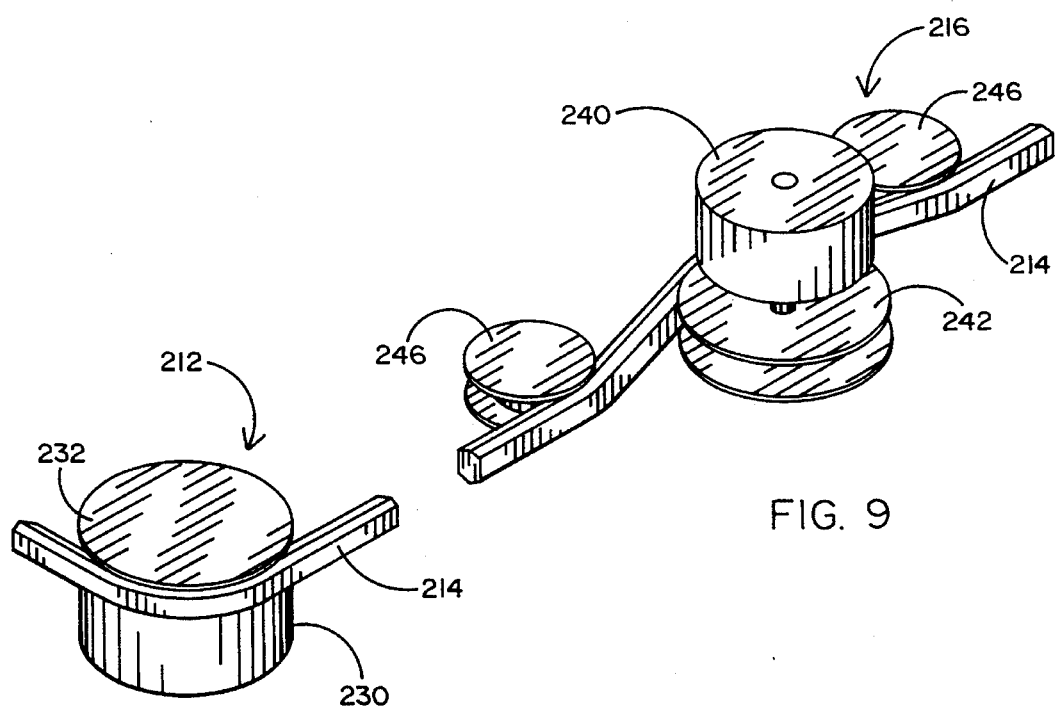
FIG. 8
FIG. 9

LOW STICTION, DUAL DRIVE, MOTIVE SYSTEM

BACKGROUND OF THE INVENTION

Cross-Related Applications

This application is a continuation in part of patent application Ser. No. 07/967,676 filed Oct. 26, 1992 entitled Low "Stiction", Dual Drive, Motive System (abandonment) which was as well a continuation in part of patent application Ser. No. 07/485,053 filed Feb. 26, 1990 entitled Low "Stiction", Dual Drive, Motive System (U.S. Pat. No. 5,311,091).

FIELD OF THE INVENTION

This invention relates generally to motive systems employing general automatic control and, more specifically, to Computerized Numeric Control (CNC). It relates further to bearings and actuating systems found in precision machine tools and robotics. These actuating systems may comprise gear trains, V-belts and pulleys, timing belts and timing pulleys, chains and sprockets wheels, and the likes, and may be generally driven from electric or hydraulic power sources. The invention relates particularly to flaws and imperfections in components constituting the motive systems and to efforts to lower the negative consequences of coulomb friction and start-up stiction in structural support bearings and motor driven actuating systems.

Coulomb friction is a constant resistance to motion that is direction sensitive; there is a sudden, discontinuous change in sign of the friction upon reversing direction of motion. Start-up stiction is defined as resistance to start-up motion following zero velocity; thus after the motive system "locks" into a zero position. These non-linear flaws are major problems frustrating accurate and repeatable automatic control.

PRIOR ART

It is desirable, in precision machine tools and robotics applications, to have a system which operates with a high degree of predictability and accuracy. However, a system with coulomb friction and stiction often suffers from undesired motion, such as jitter, that negates effective automatic servo control. One way of insuring predictability and accuracy is to lower, or eliminate, coulomb friction and stiction associated with motive mechanical parts.

The cross-related applications report on the reduction of coulomb friction and stiction and on efforts to reduce them in rotating motive systems. The status of the prior art in this regard is described therein.

This application deals with linear motive systems and their matching actuating systems effecting the linear motion. The linear motive systems are generally load support systems. It should be noted that the actuating systems may consist of rotating or a combination of rotating and linear motion. In either case the overall motive system is a combination of rotating and linear motion. In this regard, it is important to note that coulomb friction and stiction of the load support system and of the actuating system are additive so that these undesirable flaws contribute cumulatively to the overall system imperfections.

An example of a linear motive system is the dovetail slide used in a milling machine. The system consists of a linearly motive slide mounted on a base. The interface between the two components consists of flat way surfaces supporting the slide vertically and of base dovetails with companion groves in the slide for support against side motion. A thin oil film between the way surfaces maintains a relatively low friction between the components.

An example of an actuating system imparting linear motion to the dove tail slide is a feedscrew and nut assembly. Here the feedscrew lies parallel to the base and in the direction of slide motion; the nut threads unto the feedscrew much as a nut threads unto an ordinary machine screw. Rotation of the feedscrew is generally supplied by a for example an electric or a hydraulic motor. The nut is fastened to the slide. When the feedscrew is turning, the nut slides along the feedscrew thus imparting linear motion to the slide. When the feedscrew stops, the slide stops; when the feedscrew turns in the opposite direction, the slides moves in the opposite directions.

In practical application the example linear motive system inevitably exhibits coulomb friction and start-up stiction. In the case of the dovetail slide the coulomb friction is generally acceptable; the molecular film of oil provides good lubrication, particularly when the slide is in motion. However, after a period of zero velocity, after the oil film deteriorates in the absence of motion, and start-up resistance to motion can be large. This is a form of stiction. Improvements in slide support system are achieved by for example linear ball bushings.

Similarly, the feedscrew and nut assembly exhibits severe coulomb friction and stiction. When the feedscrew changes direction, for example, the rotational speed must become zero, albeit only for an instant, and stiction then "locks" the gear to provide great resistance to further motion. Significant improvement have been made by incorporating a ball screw assembly; this is essentially a nut with ball bearings. However, significant coulomb friction and stiction remains which presents significant problems to accurate and repeatable performance in a CNC system.

Various other types of attempts have been made to reduce friction in motive systems. One such attempt is magnetic suspension. This may be promising for the future but is not a present viable alternative, primarily because of cost.

A motive system is thus needed that can substantially reduce the effects of coulomb friction and start-up stiction in actuating systems in order to achieve the enhanced repeatability and accuracy desired in for example precision machine tools and robotics.

SUMMARY OF THE INVENTION

This invention creates a motive system that eliminates the effects of coulomb friction and stiction by avoiding the condition where these negative attributes manifest themselves. This is done by inserting a third motive member between a first member and a second motive member in a motive system. The first member may be a base, the second motive member is desired motive output.

In operation, the third motive member is maintained in continuous motion relative to the first motive member by third motor means; the second motive member is maintained in continuous motion relative to the third motive member by second motor means, but in an apposite direction. Consequently, when each motor maintains the same speed, the second member, or motive output, is zero; when motor speeds are next varied differentially, the motive output takes on a velocity proportional to the difference in speed of the two motor means.

It is now apparent that each motor means are in continuous motion in only one direction. The motors therefore avoid zero velocity entanglement with coulomb friction and start-up stiction; yet is the motive output free to change direction as desired.

A first embodiment consists of a dovetail slide having a base and a motive slide, two motors, a feedscrew, and a helical gear assembly. The feedscrew is mounted parallel to the base and located between the base and the slide. The first motor is mounted on the base and imparts motion to the feedscrew relative to the base. The second motor is mounted on the slide and connects to the helical gear assembly. The teeth of the helical gear are angled to mesh with the screw threads of the feedscrew. The second motor imparts motion to the helical gear relative to the slide.

In operation, the first motor turns the feedscrew continuously. The second motor drives the helical gear so that its teeth follow the threads of the feedscrew. In this condition there is zero linear motion of the helical gear assembly, and consequently zero motion of the dovetail slide. A differential speed of the motors result in linear motion of the slide.

A second embodiment consist of a dovetail slide, two motors, and a movably mounted V-belt. The dovetail slide consist of a base and a motive slide; the V-belt is mounted to encircle the base. The first motor is mounted on the base and imparts motion to the V-belt relative to the base; the second motor is mounted on the slide and imparts motion of the slide relative to the V-belt.

In operation, the first motor maintains the V-belt in continuous motion relative to the base; the second motor provides continuous opposite motion of the slide relative to the V-belt. Consequently, when the rotational speeds of the two motors are equal, the slide is stationary with respect to the base. However, changing the relative speed of the motors produces a linear motion of the slide that is proportional to the difference in motor speeds. The direction of linear motion may be changed easily by changing the relative speeds of the motors. Because the individual motor do not reverse direction, and thereby passes through zero velocity, there is no resulting jitter due to coulomb friction and start-up stiction.

The system of the present invention has important applications where the effects of coulomb friction and stiction interfere with a high degree of predictability and accuracy. It has particularly advantageous applications in servo control systems, precision machine tools, robotics, director systems, telescopes, range finders, gun turrets and directional antenna systems. Thus, the system of the present invention provides a motive system that has the needed characteristics of very low coulomb friction and no stiction resulting in a high degree of predictability and accuracy of the system output.

OBJECTS OF THE INVENTION

It is a principal object of the present invention to provide an improved motive system which provides a high degree of accuracy of the system output.

It is another principal object of the present invention to provide an improved motive system which provides a high degree of predictability of the system output.

It is also another object of the present invention to provide an improved motive system which operates without jitter in the output.

It is another object of the present invention to provide an improved motive system which avoids the effects of coulomb friction.

It is another object of the present invention to provide an improved motive system which avoids the effects of start-up stiction.

BRIEF DESCRIPTION OF THE DRAWINGS

FIG. 7 is a schematic front elevation perspective view of a dovetail slide employing a second embodiment of this invention.

FIG. 8 is a side elevation perspective detail of a power base assembly of the second embodiment of this invention.

FIG. 9 is a side elevation perspective detail of a power slide assembly of the second embodiment of this invention.

DETAILED DESCRIPTION OF THE PREFERRED EMBODIMENT

Referring in detail to the drawings, FIGS. 1, 2, 3, and 4 show a first embodiment of the invention generally designated system 100; it is a dovetail slide for a precision machine tool employing a feedscrew arrangement of this invention.

Figure 1:
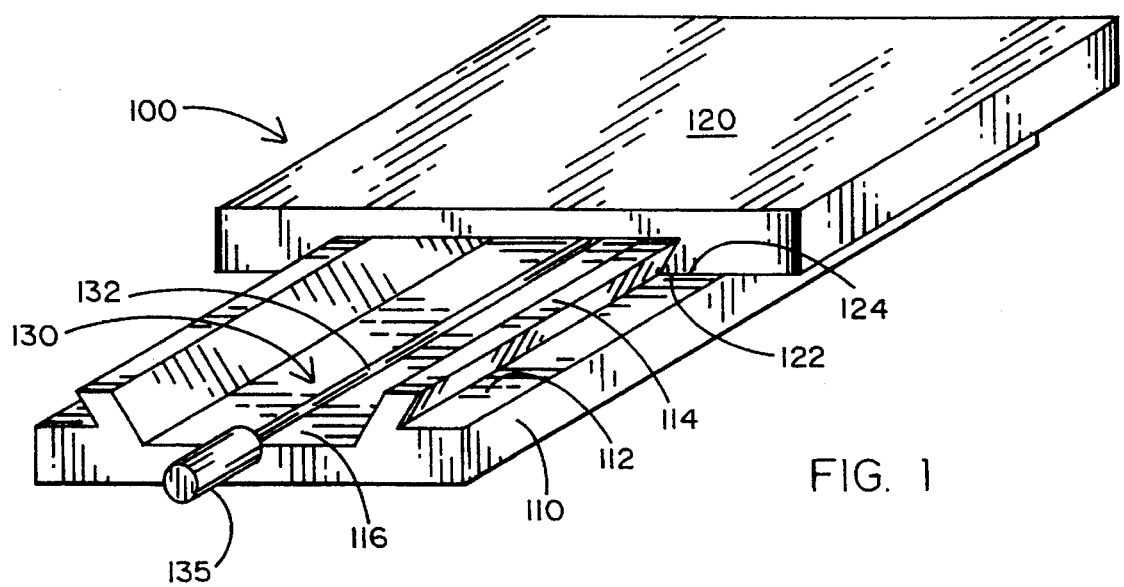
FIG. 1 is a schematic front elevation perspective view of a dovetail slide employing a first embodiment of this invention.

FIG. 1 shows system 100 with base 110 which may be securely mounted on the ground or secured to a foundational structure. Projecting upwards from the top of base 110 are dovetails 114; located between dovetails 114 is open space 116. Base 110 has precision ground way surfaces 112 adapted to receive slide 120.

Slide 120 has grooves 122 and precision ground way surfaces 124 on its underside. The grooves 122 are adapted to accommodate base dovetails 114; the way surfaces 124 are matched to way surfaces 112 to form a sliding interface between the base 110 and the slide 120. Lubricant and lubricant passages (not shown) provides smooth and accurate linear motion of the slide 120 on the base 110.

System 100 further includes feedscrew assembly 130 mounted in the open space 116 and attached to the base 110. The feedscrew assembly 130 consist of feedscrew 132, extending under the slide 120 to the length of the base 110, and of feed motor 135, attached to the base 110 and connected to the feedscrew 132. Attachment means and motor control and power means are not shown.

Figure 2:
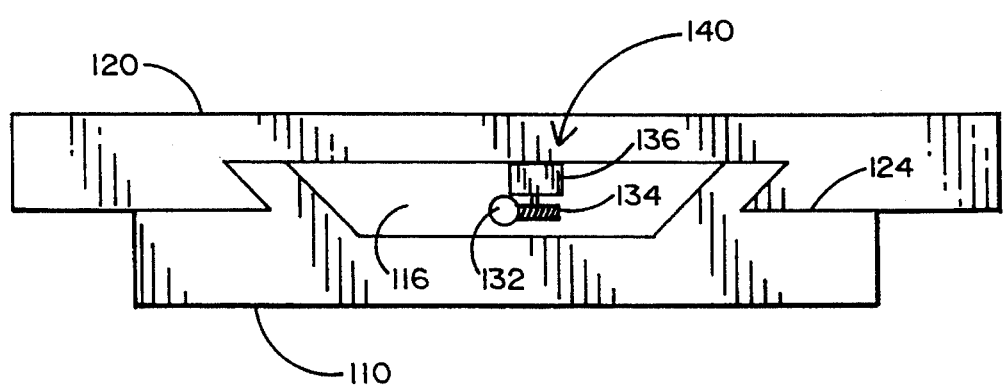
FIG. 2 is a schematic end view of FIG. 1.
Figure 3:
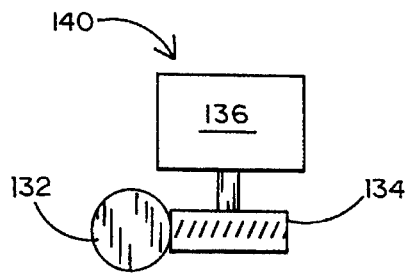
FIG. 3 is a schematic side elevation detail of a helical gear assembly employed in this invention.

FIG. 2 shows a helical gear assembly 140 consisting of helical gear 134 and gear motor 136. The helical gear assembly 140 is mounted to the underside of slide 120 and extends into the open space 116 between the base 110 and the slide 120. FIG. 3 shows in more detail a schematic side view of the helical gear assembly 140; the helical gear 134 is mounted with its axis normal to the axis of the feedscrew 132; the gear teeth of the helical gear 134 mesh with the threads of feedscrew 132. This is further illustrated in FIG. 4, a schematic top view of FIG. 3. Attachment means and motor control and power means are not shown.

Figure 4:
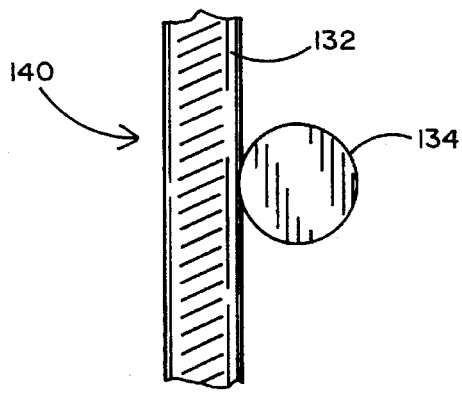
FIG. 4 is a schematic top elevation view of FIG. 3.

In illustrating the operation of the invention consider FIG. 4. The feedscrew 132 is driven by feed motor 134 at a nominal rotational speed. Assume first that the helical gear 134 is stationary; it will now have the function of an ordinary nut assembly of prior art. Denoting the feedscrew 132 as a fight hand screw, and giving a clockwise rotation, (looking into the feedscrew in FIG. 3 and from the bottom in FIG. 4), then the system will act to move the helical gear assembly 140 in a nominal negative direction (down the page in FIG. 4) at a nominal linear feed-speed set by the rotation velocity and thread lead of the feedscrew 132.

Assume next that the feedscrew 132 is stationary and that the helical gear 134 is rotating. The feed screw 132 now provides the function of the rack in a rack-and-pinion arrangement; with a counter-clockwise rotation of the helical gear 134, the helical gear assembly 140 will move (roll) with a linear speed in a positive direction (up the page in FIG. 4). With a nominal rotational speed yielding a tangential speed of the helical gear 134 equal to the linear feed-speed, the assembly will move linearly in positive direction with the same speed as the assembly moved negatively while the feedscrew turned with its nominal speed.

It can now be seen that, if both motors operate simultaneously as described above, the linear motion resulting from the two motors are equal and opposite. Therefore the net linear velocity of the helical gear assembly 140, and consequently the slide 120, is zero. Yet are both gears always moving relatively to each other and there exist no condition of zero velocity. Therefore, the system avoids the condition of coulomb friction and start-up stiction while maintaining the output, i.e. the slide speed, at zero.

It can now also seen that a desired linear motion of the slide is available simply by varying the relative speed of the two motors; the desired speed will be proportional to the difference in speed of the two motors.

Figure 5:
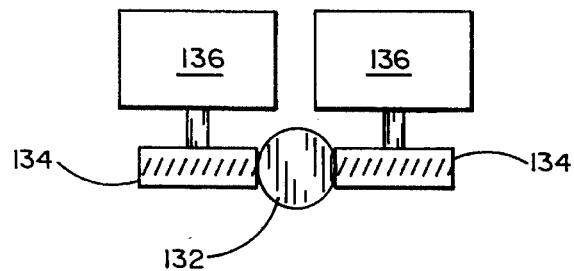
FIG. 5 is a schematic side elevation detail of a double helical gear assembly employing this invention.
Figure 6:
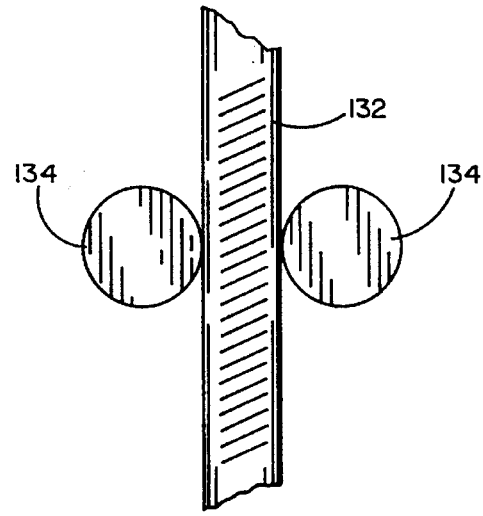
FIG. 6 is a schematic top elevation view of FIG. 5.

An alternate design of the helical assembly 140 is shown in FIG. 5 and FIG. 6. The figures show two motor with two helical gears mounted one on each side of the feedscrew. The arrangement alleviates uneven loads on the feedscrew by balancing the pressures exerted by the two helical gears.

Referring in detail to the drawings, FIGS. 7, 8, and 9 show a second embodiment of this invention generally designated system 200; it is a dovetail slide for a precision machine tool employing a V-belt drive mechanism of this invention.

FIG. 7 shows system 200 with a base 210 and a slide 220 of a dovetail slide. The dovetail slide was fully described in the first embodiment of FIG. 1 and need not be repeated. System 200 includes four power base assemblies 212 mounted in each corner of the base 210, their axes vertical. A double sided V-belt 214 stretches around the four power assemblies 212 and consequently encircle the base 210. The power base assemblies couple to the V-belt 214 and impart linear velocity of the V-belt 214 relatively to the base 210.

FIG. 8 shows in more detail a schematic of a power base assembly 212. A base motor 230 connects to a base pulley 232; the combination drives a double-sided V-belt 214. The V-belt connects with the base pulley 232. Attachment means, control means, and power means are not shown.

System 200 also includes two power slide assemblies 216 mounted one in each side of the slide 220 as shown in FIG. 7. The power slide assemblies 216 also couple to the V-belt 214 and impart a linear velocity of the slide 220 relative to the V-belt 214. FIG. 9 shows in more detail a schematic of a power slide assembly 216. A slide motor 240 drives slide pulley 242 which is connected to the double sided V-belt 214. Two idler pulleys 246 bend the V-belt 214 to secure a better connection between the V-belt 214 and the slide pulley 242. Attachment means, control means, and power means are not shown.

The operation of the system 200 is similar to that of system 100 described above. The four power base assemblies 212 drive the V-belt 214 at a nominal speed relative to the base 210. Similarly, the power slide assemblies 216 drive the slide 220 at the same nominal velocity relative to the V-belt 214 but in an opposite direction. The result is that the nominal speeds cancel; there is therefore no motion of the slide 220 relative to the base 210 even though both power assemblies are moving at a nominal speed. Therefore, the system avoids the condition of coulomb friction and start-up stiction while maintaining the output, i.e. the slide speed, at zero.

As with system 100, a linear slide motion is easily available by varying the differential speed of the two types of power assemblies; the linear speed is again proportional to the differential speed, i.e. the difference in speed, between the two types of power assemblies.

Thus, there has been provided, in accordance with the invention, a motive system which operates without coulomb friction and start-up stiction and which is relatively simple in construction and therefore preferable over more expensive alternatives. It is to be understood that all the terms used herein are descriptive rather than limiting. Although the invention has been described in conjunction with the specific embodiments set forth above, many alternative embodiments, modifications and variations will be apparent to those skilled in the art in light of the disclosure set forth herein.

For example, the dovetail construction may be easily and profitably be replaced by a table supported with linear ball bushings. Similarly, the V-belt and pulleys may be replaced by timing belts and timing pulleys or with chains and sprockets wheels.

Accordingly, it is intended to include all such alternative embodiments, modifications and variations that fall within the spirit and scope of the inventive concepts as set forth in the claims hereinbelow.

I claim:

1. A method of eliminating effects of coulomb friction and start-up stiction in a controlled motive system having a base, a linearly motive member, and a first actuating member therebetween, comprising the steps of:

adding at least one second actuating member in series with the first actuating member; and maintaining the first actuating member and the at least one second actuator member in relative motion.

2. A method of eliminating effects of coulomb friction mid start-up stiction according to claim 1, comprising the additional step of:

providing differential speed control of the first actuating member and the at least one second actuating member.

3. An actuation system for a precision linearly motive system having a base and a motive output comprising:

actuator means motively coupled to the base;

adaptor means motively connecting the actuator means and the motive output;

power drive means for the actuator and adaptor means; and differential speed control means for the power drive means.

4. An actuation system for a precision motive system according to claim 3 where the actuator means is a feedscrew.

5. An actuation system for a precision motive system according to claim 4 where the adaptor means is a helical gear assembly positioned to mesh with the feedscrew.

6. An actuation system for a precision motive system according to claim 4 where the adaptor means is an assembly having two helical gears mounted on opposite sides of the feedscrew.

7. An actuation system for a precision motive system having a base and a linearly motive output comprising:

a V-belt;

base pulleys coupling the V-belt to the base through at least one motive base actuating member;

at least one output pulley coupling the V-belt to the motive output through at least one motive output actuating member; and differential speed control means of the at least one motive base actuating member and the at least one motive output actuating member.

8. An actuation system for a precision motive system according to claim 7 where the V-belt and pulleys are replaced with timing belts and timing pulleys.

9. An actuation system for a precision motive system according to claim 7 where the V-belt and pulleys are replaced with chains and sprocket wheels.

* * * * *